United States Patent [19]
Yaegashi et al.

[11] Patent Number: 5,697,850
[45] Date of Patent: Dec. 16, 1997

[54] DRIVING SHAFT HAVING SPLINED MALE AND FEMALE PORTIONS

[75] Inventors: Toshihiko Yaegashi; Minoru Sagara, both of Tokyo, Japan

[73] Assignee: Matsui Universal Joint Manufacturing Company, Japan

[21] Appl. No.: 402,929

[22] Filed: Mar. 13, 1995

[30] Foreign Application Priority Data

Mar. 17, 1994 [JP] Japan ................................ 6-047068
Oct. 13, 1994 [JP] Japan ................................ 6-247825

[51] Int. Cl.$^6$ ................................................ F16C 3/03
[52] U.S. Cl. ................................................ 464/162
[58] Field of Search ................................ 464/162, 179, 464/182, 172; 403/359, 298; 74/462

[56] References Cited

U.S. PATENT DOCUMENTS

| | | | |
|---|---|---|---|
| 2,199,926 | 5/1940 | Swennes | 464/162 X |
| 2,380,952 | 8/1945 | Dewey | 464/182 |
| 2,571,318 | 10/1951 | Warner | 464/183 |
| 2,772,547 | 12/1956 | Nolan | 464/183 X |
| 2,978,885 | 4/1961 | Davison | 464/182 X |
| 3,293,884 | 12/1966 | Grob | |
| 4,348,874 | 9/1982 | Müller et al. | 464/182 X |
| 4,397,171 | 8/1983 | Suh et al. | |
| 4,622,022 | 11/1986 | Diffenderfer et al. | 464/162 |
| 4,838,832 | 6/1989 | Schmitt et al. | 464/162 |
| 4,915,536 | 4/1990 | Bear et al. | 464/182 X |
| 5,226,853 | 7/1993 | Courgeon | 464/172 X |
| 5,243,874 | 9/1993 | Wolfe et al. | |

FOREIGN PATENT DOCUMENTS

| | | |
|---|---|---|
| 3635916 | 3/1988 | Germany. |
| 839155 | 6/1960 | United Kingdom. |
| 2114482 | 8/1983 | United Kingdom. |

*Primary Examiner*—Daniel P. Stodola
*Assistant Examiner*—Eileen A. Dunn
*Attorney, Agent, or Firm*—Silverman, Cass & Singer, Ltd.

[57] ABSTRACT

A driving shaft having splined male and female shafts. The spline tooth pattern of the male shaft seen in a cross-section comprises an inclined portion substantially similar to those of a symmetrical spline tooth pattern of a conventional male shaft, and an outwardly convex and gently curved portion starting from the outer end of the inclined portion and terminating in a smaller diameter portion at the bottom of the tooth pattern. The radius of the smaller diameter portion and the tooth width at the bottom of the tooth pattern are larger than those in the symmetrical spline tooth pattern of the conventional male shaft, thereby obtaining an improved driving shaft to transmit greater rotating torque. The spline sliding portion of the female shaft is formed from a hollow tube by press-forming in a manner that the outer diameter of the press-formed portion is larger than that of a hollow blank tube, thereby increasing the torque transmission diameter to reduce surface pressure resulting in prolonged service life.

3 Claims, 4 Drawing Sheets

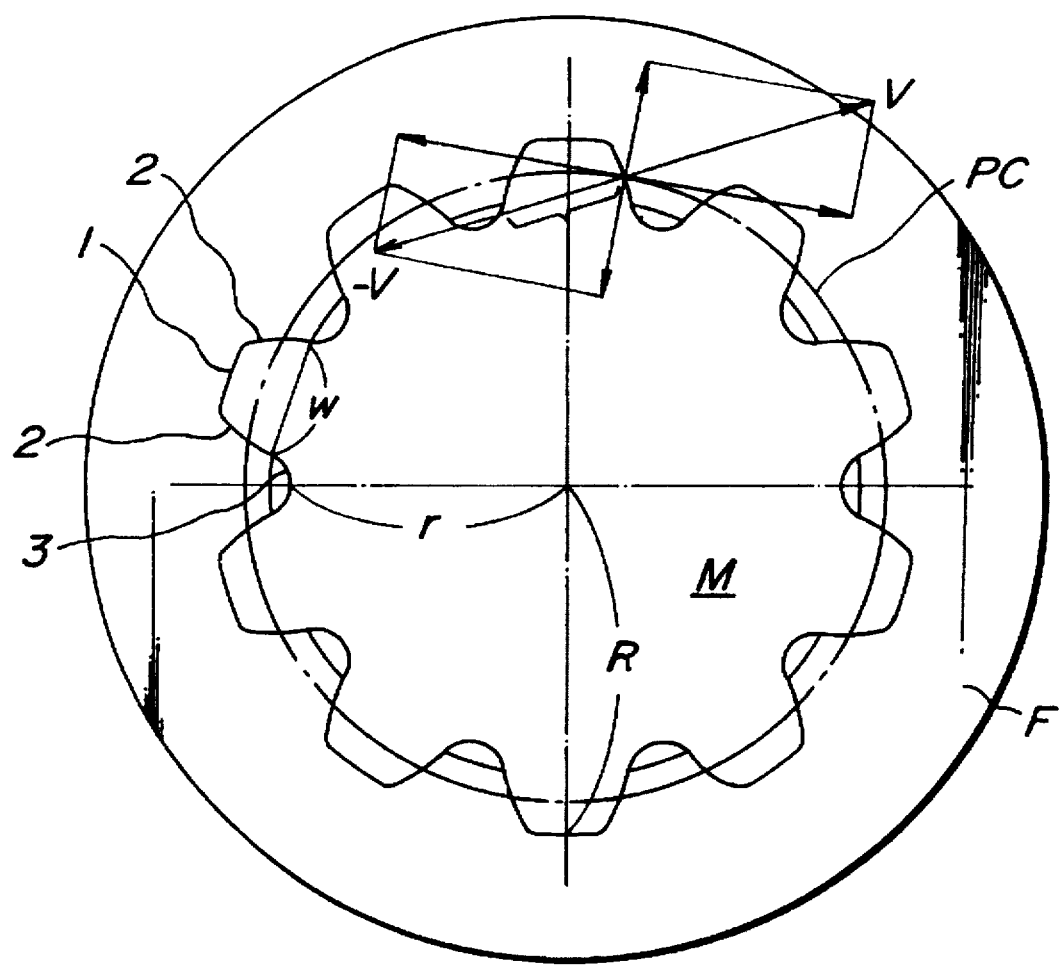
FIG_1
PRIOR ART

FIG_2
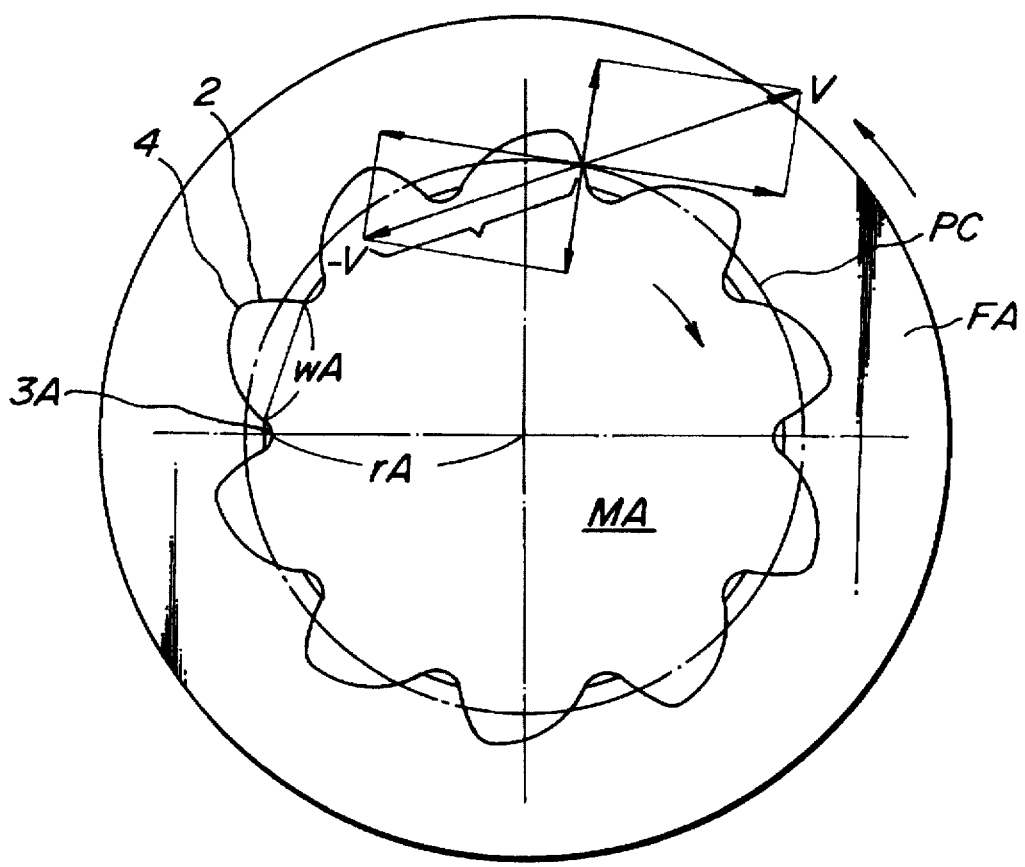
FIG_3
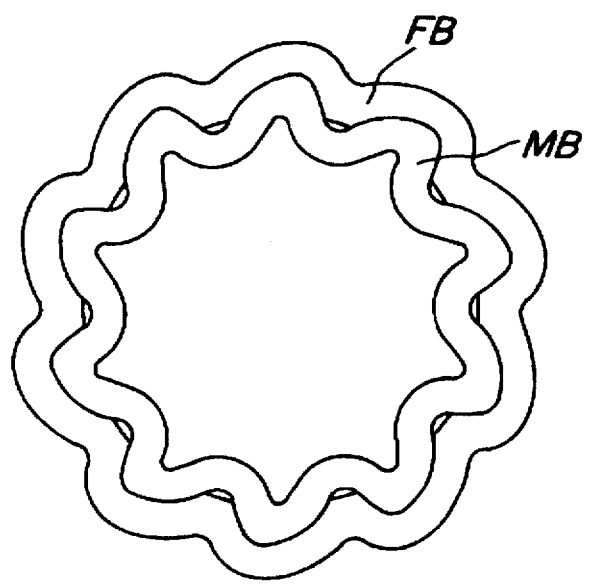

FIG_5a
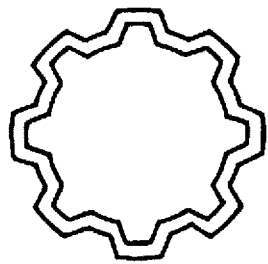
FIG_5b
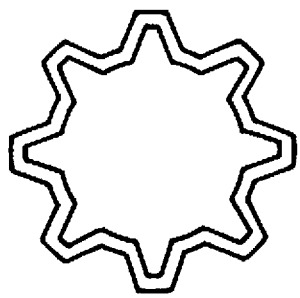
FIG_5c
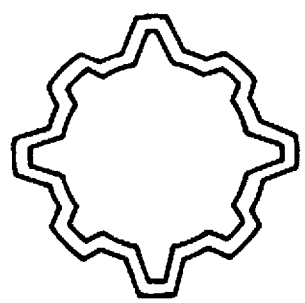

DRIVING SHAFT HAVING SPLINED MALE AND FEMALE PORTIONS

BACKGROUND OF THE INVENTION

This invention relates to a driving shaft including a male shaft having, on its external surface, spline teeth of a tooth pattern and a female shaft having, on its internal surface, spline teeth of a tooth pattern complementary in shape with the spline teeth of the male shaft to transmit power between the male and female shafts when they are engaged with each other with their spline teeth, and more particularly this invention relates to a driving shaft consisting of male and female shafts having spline sliding portions fitted with each other, and at least part of at least the female shaft being a hollow tube and its spline sliding portion being formed by press-forming.

In hitherto used driving shafts, the male spline tooth pattern of a male shaft M has a substantially larger flat or outer diameter portion 1, inclined portions 2 on both sides thereof, and smaller or inner diameter portions 3 continuous to the inclined portions of the adjacent spline teeth to form a spline tooth pattern in symmetry with respect to the radius line passing through the center of the spline tooth pattern.

The driving shaft having such a symmetrical male spline tooth pattern is appropriate to the case that rotations in normal and reverse directions are used at substantially the same rates, but not appropriate when the driving shaft is mainly used only in one rotating direction.

Moreover, the spline sliding portion of a female shaft has been generally machined by broaching into a finished spline shape in predetermined size. On the other hand, a male shaft has been generally produced from a solid bar by machining and its spline sliding portion has been machined by hobbing or frequently by press-forming.

Therefore, the female shaft has at its spline sliding portion an outer diameter substantially equal to that of a blank material of the female shaft. Moreover, the male shaft is formed from a solid bar by cutting at its outer surface. In order to make large torque transmission diameters to reduce surface pressure for improvement of transmission efficiency and prolongation of service life, it is therefore needed to use male and female shaft blank materials having larger outer diameters resulting into increase of material cost.

SUMMARY OF THE INVENTION

It is an object of the invention to provide a driving shaft, which is used in one rotating direction or more frequently in one rotating direction, capable of transmitting rotating torque in that direction with higher efficiency.

It is another object of the invention to provide a driving shaft having a larger torque transmission diameter to reduce surface pressure, thereby improving its transmission efficiency and prolonging its service life.

In order to accomplish the first object, the driving shaft according to the invention is constructed in that the number of said spline teeth of said male shaft is equal to that of a conventional male shaft having a symmetrical spline tooth pattern seen in a cross-section perpendicular to the axis of said conventional male shaft composing of a substantially flat larger diameter portion, inclined portions on both sides thereof, and smaller diameter portions continuous to inclined portions of adjacent tooth patterns, and wherein said tooth pattern of said male shaft seen in a cross-section perpendicular to the axis of said driving shaft comprises an inclined portion substantially similar to said inclined portion of said symmetrical spline tooth pattern of said conventional male shaft, and an outwardly convex and gently curved portion starting from the outer end of said inclined portion and terminating in a smaller diameter portion at the bottom of the tooth pattern, the radius of said smaller diameter portion being larger than that of a symmetrical spline tooth pattern of said conventional male shaft, and the tooth width at the bottom of the tooth pattern being larger than that of said symmetrical spline tooth pattern of said conventional male shaft.

In one embodiment of the invention, the male shaft of the driving shaft is hollow.

With the construction of the driving shaft according to the invention, the wider tooth width at the bottom of the tooth pattern makes it possible to transmit larger torque in one rotating direction supporting torque reaction only by one inclined portion of each of spline teeth.

In order to accomplish the second object, in the driving shaft according to the invention, the outer diameter of the press-formed spline sliding portion is larger than that of a hollow blank tube.

According to the invention, a hollow tube is worked by press-forming so as to be plastically deformed in a manner that the outer diameter of the spline sliding portion becomes larger than that of the hollow blank tube without raising the material cost.

In a preferred embodiment of the invention, all spline teeth of the spline sliding portion are relatively flat and lower to contact the mating spline teeth at larger diameter portion of the male shaft.

In another preferred embodiment of the invention, moreover, all spline teeth of the spline sliding portion are relatively high to contact the mating spline teeth at side surfaces of the spline teeth of the male shaft.

In the above two embodiments, with all the spline teeth contacting at the larger diameter portions, play or free motion may occur in a rotating direction, while with all the spline teeth contacting at side surfaces of spline teeth of the male and female shaft, play may also occur in directions perpendicular to axes of the male and female shafts (directions of bending acting upon these shafts). In a further embodiment of the invention, therefore, relatively lower and higher spline teeth are circumferentially alternately arranged, the lower spline teeth contacting the mating spline teeth at larger diameter portions, and the higher spline teeth contacting the mating spline teeth at side surfaces of the spline teeth of the male and female shaft.

The invention will be more fully understood by referring to the following detailed specification and claims taken in connection with the appended drawings.

BRIEF DESCRIPTION OF THE DRAWINGS

FIG. 1 is a cross-sectional view of the driving shaft according to the prior art;

FIG. 2 is a cross-sectional view of the driving shaft according to the first embodiment of the invention;

FIG. 3 is a cross-sectional view of the driving shaft according to the second embodiment of the invention;

FIGS. 5a to 5c are cross-sectional views taken along the line V—V in FIG. 4, illustrating different cross-sections of female shafts in various embodiments of the invention, respectively.

DESCRIPTION OF THE PREFERRED EMBODIMENTS

Figure 4:
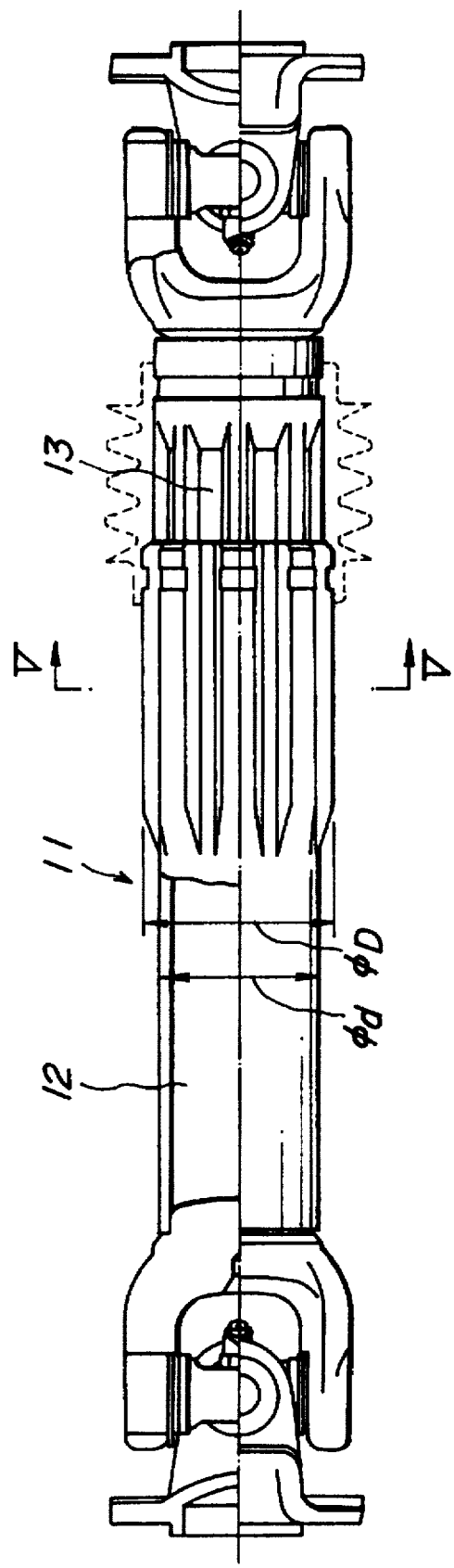
FIG. 4 is a side view of the driving shaft according to the third embodiment of the invention.

FIG. 2 illustrates a driving shaft according to one embodiment of the invention shown in cross-section taken along a plane perpendicular to its axis. As shown in FIG. 2, the male shaft MA of the driving shaft according to the invention has the same number of spline teeth as that of the male shaft shown in FIG. 1, but differs in male spline tooth pattern from that of the prior art as shown in FIG. 1. As described above, the male spline tooth pattern of the prior art shown in FIG. 1 has a substantially larger flat or outer diameter portion 1, inclined portions 2 on both sides thereof, and smaller or inner diameter portions 3 continuous to the inclined portions of the adjacent spline teeth to form a spline tooth pattern in symmetry with respect to the radius line R passing through the center of the spline tooth pattern.

With the modified spline tooth pattern according to the invention, in more detail, one of inclined portions 2 is unaltered or substantially same in configuration as that of the prior art, but another portion is outwardly convex and gently curved which starts from the outer end or corner of the inclined portion 2 and terminates in the smaller diameter portion 3A of the other side. The radius rA of the smaller diameter portion 3A and the tooth width wA at the tooth bottom are larger than the radius r and the tooth width w of the male spline tooth pattern of the prior art shown in FIG. 1, respectively.

The unaltered inclined portion 2 of the tooth pattern is arranged on that side of the spline tooth on which the torque pressure is substantially applied when the driving shaft is rotated in the more frequent rotating direction.

The female shaft FA is formed in its inner surface with female spline teeth of a spline tooth pattern complementary in shape with the spline tooth pattern of the male shaft MA described above. However, smaller or inner diameter portion of the female shaft is substantially flat and forms clearances with the smaller diameter portion of the male shaft therebetween.

FIG. 3 illustrates a cross-section of the driving shaft taken along a plane perpendicular to its axis according to the second embodiment of the invention, whose male shaft MB is hollow and to be fitted in the female shaft FB with spline engagement. The external profile of the male shaft MB and the internal profile of the female shaft FB are similar to those of the first embodiment shown in FIG. 2.

Referring again to FIG. 2, it is assumed that the female shaft FA is rotated in the counterclockwise direction to transmit a torque to the male shaft MA so that the vector V of a reaction acts upon the spline teeth of the male shaft at the pitch circle of the spline teeth of the driving shaft composing of the male and female shaft MA and FA.

With such a condition, the spline tooth is subjected to a stress −V. According to the invention, the whole the stress −V can be supported by the widened tooth bottom width wA. In contrast herewith, it is needed for the prior art to support the stress −V of the same reaction vector at the pitch circle solely by the narrower tooth bottom width w as shown in FIG. 1. In other words, according to the invention, the driving shaft rotated in one direction or more frequently in one direction has higher strength capable of transmit a greater torque than in the prior art driving shaft.

While the driving shaft according to the invention is advantageous in rotation in one direction or more frequently in one direction for torque transmission, it will be apparent that the driving shaft is able to transmit any torque in the opposite direction of rotation because of a lock resulting from the supplementary shapes of spline teeth of the male and female shafts fitted with each other even if the surfaces are outward convex and gently curved.

As can be seen from the above explanation, the driving shaft according to the invention has higher strength to transmit a greater torque than the driving shaft of the prior art in the case that it is rotated in one direction or more frequently in one direction.

FIG. 4 illustrates in a side view the driving shaft of the third embodiment of the invention. In order to produce the female shaft 12 of the driving shaft 11, a die, for example, in the form of a mandrel is inserted into a hollow blank tube which is then press-formed (plastically deformed) in the manner that the outer diameter $\phi D$ of spline sliding portion of the female shaft is larger than the outer diameter $\phi d$ of the hollow blank tube. While the female shaft is formed in a relation of $\phi D > \phi d$ in this embodiment shown in FIG. 4, the male shaft 13 may also be formed from a hollow blank tube in the same relation of the diameters.

FIGS. 5a to 5c illustrate various sections of spline slide portions of female shafts according to the embodiments of the invention. In the embodiment shown in FIG. 5a, the spline teeth of a female shaft are relatively flat whose height is relatively lower. All the spline teeth of the female shaft are adapted to be brought into contact with spline teeth of a male shaft at its larger diameter portion. In other words, when the male and female shafts are fitted with each other with their spline teeth, top surfaces of spline teeth of the male shaft are adapted to be in sliding contact with internal bottom surfaces of the female shaft at its larger diameter portion.

In the embodiment shown in FIG. 5b, the spline teeth of a female shaft are relatively higher in order to bring all the spline teeth of the female shaft into sliding contact with surfaces of spline teeth of a male shaft. In this embodiment, when the male and female shafts are fitted with each other with their spline teeth, the side surfaces of the spline teeth of the male shaft are in sliding contact with the inner side surfaces of the spline teeth of the female shaft.

In the embodiment shown in FIG. 5c, relatively lower and higher spline teeth of the female shaft are circumferentially alternately arranged in its inside. The lower spline teeth are relatively flat, which are adapted to be brought into contact with spline teeth of a male shaft at its larger diameter portion, while the higher spline teeth are adapted to bring their side surfaces into sliding contact with the side surfaces of the spline teeth of the male shaft.

With the spline teeth shown in FIG. 5a, some clearances exist at the side surfaces of the spline teeth, so that there may be a tendency for the contacting teeth to cause play or free motion in a rotating direction. On the other hand, with the spline teeth shown in FIG. 5b, some clearances exist between the top surfaces of teeth of the male shaft and the internal bottom surfaces of teeth of the female shaft, there is a tendency for them to cause play in directions perpendicular to axes of the male and female shafts (directions of bending acting upon them). With the spline teeth shown in FIG. 5c, however, they contact each other at the side surfaces and the top and internal bottom surfaces of the teeth, so that they can advantageously prevent plays both in the rotating and bending directions.

As can be seen from the above explanation, according to the latter embodiments of the invention the driving shaft is produced from a hollow tube by press-forming without increasing any material and manufacturing cost owing to the simplicity of the producing process. The driving shaft thus produced has outer diameter at the spline sliding portions of the male and female shaft larger than the outer diameter of a blank tube so that the torque transmission diameter becomes greater so as to reduce surface pressure acting upon the spline teeth of the male and female shafts with the result that the durability of the driving shaft is improved to prolong its service life.

Moreover, as the outer diameter at the spline sliding portions of the driving shaft according to the invention is larger than the outer diameter of a blank tube, the larger diameter portions of the spline teeth serve as heat radiating fins to improve the heat radiation efficiency for the heat produced by sliding movements. As a result, a lubricant such as grease is prevented from its deterioration by the efficient limitation of raising temperature, so that the durability of the driving shaft is more improved to prolong its service life.

While the invention has been particularly shown and described with reference to preferred embodiments thereof, it will be understood by those skilled in the art that the foregoing and other changes in form and details can be made therein without departing from the scope of the claims.

What is claimed is:

1. A driving shaft comprising, a male and female shaft each having spline sliding portions at one end thereof fitted with each other, at least the splined sliding portion of each of the male and female shafts being a hollow tube, a cylindrical portion of the female shaft has an outer diameter which is located at a predetermined radius, the splined portion of the female shaft including spline teeth, each tooth having a flat top surface which is radially spaced from the cylindrical portion of the female shaft and a bottom surface which is located on a radius that is at least equal to the cylindrical portion of the female shaft so that the teeth of the female shaft are elevated above the cylindrical portion, the splined portion of the male shaft including spline teeth of a pattern complementary in shape with the spline teeth of the female shaft, the top surfaces of the spline teeth of the male shaft being in sliding contact with the bottom surfaces of the spline teeth of the female shaft; and a drive coupling at an end of each said male and female shafts remote from said spline sliding portions.

2. A driving shaft comprising, a male and a female shaft each having spline sliding portion at one end thereof fitted with each other, at least splined sliding portion of each of the male and female shafts being a hollow a cylindrical portion of the female shaft has an outer diameter which is located at a predetermined radius, the splined portion of the female shaft including spline teeth, each tooth having an extended elongate portion which radially extends from the cylindrical portion of the female shaft so as to provide side surfaces of said teeth so that the teeth of the female shaft are elevated above the cylindrical portion, the splined portion of the male shaft including spline teeth of a pattern complementary in shape with the spline teeth of the female shaft, the side surfaces of the spline teeth of the male and female shafts being in sliding contact with each other; and a drive coupling at an end of each said male and female shafts remote from said spline sliding portions.

3. A driving shaft comprising, a male and female shaft each having spline sliding portion at one end thereof fitted with each other, at least the splined sliding portion of each of the male and female shafts being a hollow tube, a cylindrical portion of the female shaft has an outer diameter which is located at a predetermined radius, the splined portion of the female shaft including spline teeth, said spline teeth including selected ones having a flat top which is radially spaced from the cylindrical portion of the female shaft and selected others having an extended elongate portion which radially extends from the cylindrical portion of the female shaft as to provide side surfaces of said selected others of said spline teeth so that the selected ones and the selected others of the teeth of the female shaft are elevated above the cylindrical portion, the selected ones and selected others of said spline teeth being circumferentially alternately arranged about the female shaft, the splined portion of the male shaft including spline teeth of a pattern complementary in shape with the spline teeth of the female shaft, the top surfaces of the selected ones of said spline teeth of the male shaft being in sliding contact with the bottom surfaces of the selected ones of the spline teeth of the female shaft, the side surfaces of the selected others of the spline teeth of the male and female shafts being in sliding contact with each other; and a drive coupling at an end of each said male and female shafts remote from said spline sliding portions.

* * * * *

UNITED STATES PATENT AND TRADEMARK OFFICE
CERTIFICATE OF CORRECTION

PATENT NO. : 5,697,850
DATED : December 16, 1997
INVENTOR(S) : Toshihiko Yaegashi and Minoru Sagara It is certified that error appears in the above-indentified patent and that said Letters Patent is hereby corrected as shown below:

Column 5, line 37, after "least" insert --the--.

Signed and Sealed this

Seventeenth Day of February, 1998

*Attest:*

BRUCE LEHMAN

*Attesting Officer*     *Commissioner of Patents and Trademarks*